United States Patent
Laroia et al.

(10) Patent No.: US 8,385,826 B2
(45) Date of Patent: Feb. 26, 2013

(54) METHODS AND APPARATUS FOR SUPPORTING COMMUNICATION OVER DIFFERENT RANGES IN A WIRELESS NETWORK

(75) Inventors: Rajiv Laroia, Far Hills, NJ (US); Junyi Li, Chester, NJ (US); Saurabh Tavildar, Jersey City, NJ (US); Xinzhou Wu, Monmouth Junction, NJ (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 726 days.

(21) Appl. No.: 12/465,938

(22) Filed: May 14, 2009

(65) Prior Publication Data

US 2010/0291872 A1 Nov. 18, 2010
US 2012/0088450 A9 Apr. 12, 2012

Related U.S. Application Data

(63) Continuation-in-part of application No. 12/123,266, filed on May 19, 2008.

(60) Provisional application No. 60/948,977, filed on Jul. 10, 2007.

(51) Int. Cl.
H04B 7/00 (2006.01)
(52) U.S. Cl. .................. 455/41.2; 455/48; 455/91
(58) Field of Classification Search ........... 455/39–48, 455/91–355
See application file for complete search history.

(56) References Cited

U.S. PATENT DOCUMENTS

| | | | | |
|---|---|---|---|---|
| 6,141,533 A | * | 10/2000 | Wilson et al. | 455/11.1 |
| 2002/0172213 A1 | | 11/2002 | Laroia et al. | |
| 2004/0253924 A1 | * | 12/2004 | Acampora | 455/41.2 |
| 2005/0048982 A1 | | 3/2005 | Roland et al. | |
| 2007/0042706 A1 | * | 2/2007 | Ledeczi et al. | 455/3.01 |
| 2008/0279137 A1 | * | 11/2008 | Pernu et al. | 370/328 |
| 2009/0017829 A1 | * | 1/2009 | Laroia et al. | 455/446 |
| 2009/0221283 A1 | * | 9/2009 | Soliman | 455/426.1 |

FOREIGN PATENT DOCUMENTS

| | | |
|---|---|---|
| EP | 2012479 A1 | 1/2009 |
| WO | WO2006099242 | 9/2006 |

OTHER PUBLICATIONS

International Search Report and Written Opinion—PCT/US2010/034878, International Search Authority—European Patent Office—Dec. 28, 2010.

* cited by examiner

*Primary Examiner* — Lincoln Donovan
*Assistant Examiner* — Brandon S Cole
(74) *Attorney, Agent, or Firm* — James O'Hare; Paul S. Holdaway

(57) ABSTRACT

Methods and apparatus well suited for supporting communications over different ranges in, for example, a peer to peer wireless communications system, are described. In the peer to peer network at least some of the types of signals, e.g., peer discovery signals and/or paging signals, are transmitted with no closed loop power control. An exemplary peer to peer timing structure includes air link resources allocated for a particular type of signaling in which the resources are segmented into multiple blocks which do not overlap in time, different ones of the multiple blocks being associated with different ranges. The characteristics of the basic transmission units of the multiple blocks based on range are different, e.g., tone size and symbol width are different. A wireless communications device implements the peer to peer timing structure and uses resources from different range based blocks at different times. Data traffic transmission units may be the same regardless of the range.

16 Claims, 16 Drawing Sheets

| FIGURE 10A | FIGURE 10B | FIGURE 10C | FIGURE 10D |

METHODS AND APPARATUS FOR SUPPORTING COMMUNICATION OVER DIFFERENT RANGES IN A WIRELESS NETWORK

RELATED APPLICATIONS

The present application is a continuation-in-part of U.S. patent application Ser. No. 12/123,266, filed May 19, 2008 which claims the benefit of the filing date of U.S. Provisional Patent Application Ser. No. 60/948,977 filed Jul. 10, 2007.

FIELD

Various embodiments relate to wireless communications, and more particularly, to methods and apparatus which can be used for performing communications over different physical ranges in a wireless network.

BACKGROUND

In many conventional cellular wireless communications networks, transmission power over a plurality of wireless links is controlled in a centralized manner. For example, a base station or central controller device may coordinate communications corresponding to a plurality of mobiles which are using the base station as a point of network attachment in the communications system. The base station and/or central controller manages resource allocation and communications corresponding to a plurality of mobiles competing for the limited air link resources, e.g., granting or denying access, assigning air link resources to mobiles, tracking mobile position, measuring communications channels, controlling transmission power levels, controlling data rates, and/or managing interference. The base station and/or centralized control device can, and generally does, perform closed loop power and timing control operations as part of the management and control of mobile transmissions. Since the base station and/or centralized controller has a good overall view of the situation in a cell, it can effectively manage communications corresponding to a plurality of different links between mobiles and the base station. For example, the base station can power control uplink transmissions from mobiles located different distances away from the base station such that the received power at the base station will be within an acceptable range for signal recovery of both long range and short range signals.

In the field of wireless communications there has been a trend to make spectrum available for use by various types of networks in addition to conventional cellular networks. One such network type which has been gaining in popularity and utilization is a peer to peer network, e.g., peer to peer networks lacking centralized control. It is desirable that a peer to peer network be able to support reliable communications over a wide range of distances. In a peer to peer network, lacking centralized control and/or management, transmitted signals from one device may cause problems to other devices. In particular a receiver corresponding to a short range link, situated very close to a transmitter for a long range link, can be saturated and/or de-sensed, e.g., suffer from a lower ability to detect a signal of interest, because of the signal of a long range link which may be occurring concurrently. A resulting unacceptable level of interference may prevent recovery of the information of interest being communicated on the short range link.

Based on the above discussion there is a need for new methods and apparatus that can support communications over different ranges in a peer to peer wireless network.

SUMMARY

Methods and apparatus for supporting communications over different ranges in a wireless communications system are described. Various methods and apparatus are well suited to peer to peer networks, e.g., ad hoc peer to peer networks, lacking centralized control.

In a wireless peer to peer network different peers may wish to communicate over different distances. Methods and apparatus, in accordance with various embodiments, are advantageous in avoiding saturation and/or de-sense from occurring in receiver devices. In one, but not necessarily all, exemplary peer to peer networks at least some of the types of signals, e.g., peer discovery signals and/or paging signals, are transmitted with no closed loop power control. An exemplary peer to peer timing structure, used in some exemplary embodiments, includes air link resources allocated for a particular type of signaling in which the resources are segmented into multiple blocks which do not overlap in time. Different ones of the multiple blocks of communications resources are associated with different ranges, e.g., short, medium, or long range communications. In some embodiments, the characteristic of the basic transmission units of the multiple blocks based on range are different. For example, a basic transmission unit of a short range peer discovery resource block may have a wider tone and a narrower symbol transmission time interval in comparison to the basic transmission unit of a long range peer discovery resource block.

In some embodiments, for some types of signals, e.g., peer discovery signals and/or peer paging signals, wireless communications devices use different resources with different basic transmission unit characteristics as a function of intended transmission range, while for other types of signals, e.g., peer to peer traffic channel signals, the wireless communications devices use a resource, e.g., a peer to peer traffic segment, with the same basic transmission unit characteristics irrespective of the range. In some such embodiments, the transmission power level of peer to peer traffic channel signals are controlled as a function of a decentralized interference management scheme.

An exemplary communications method, in accordance with some embodiments, comprises: using a first communications resource in a first time interval dedicated to short range communications; and using a second communication resource in a second time interval dedicated to long range communications, the first and second time intervals being non-overlapping time intervals. An exemplary communications device, in accordance with some embodiments, comprises: at least one processor configured to: use a first communications resource in a first time interval dedicated to short range communications; and use a second communication resource in a second time interval dedicated to long range communications, the first and second time intervals being non-overlapping time intervals. The exemplary communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
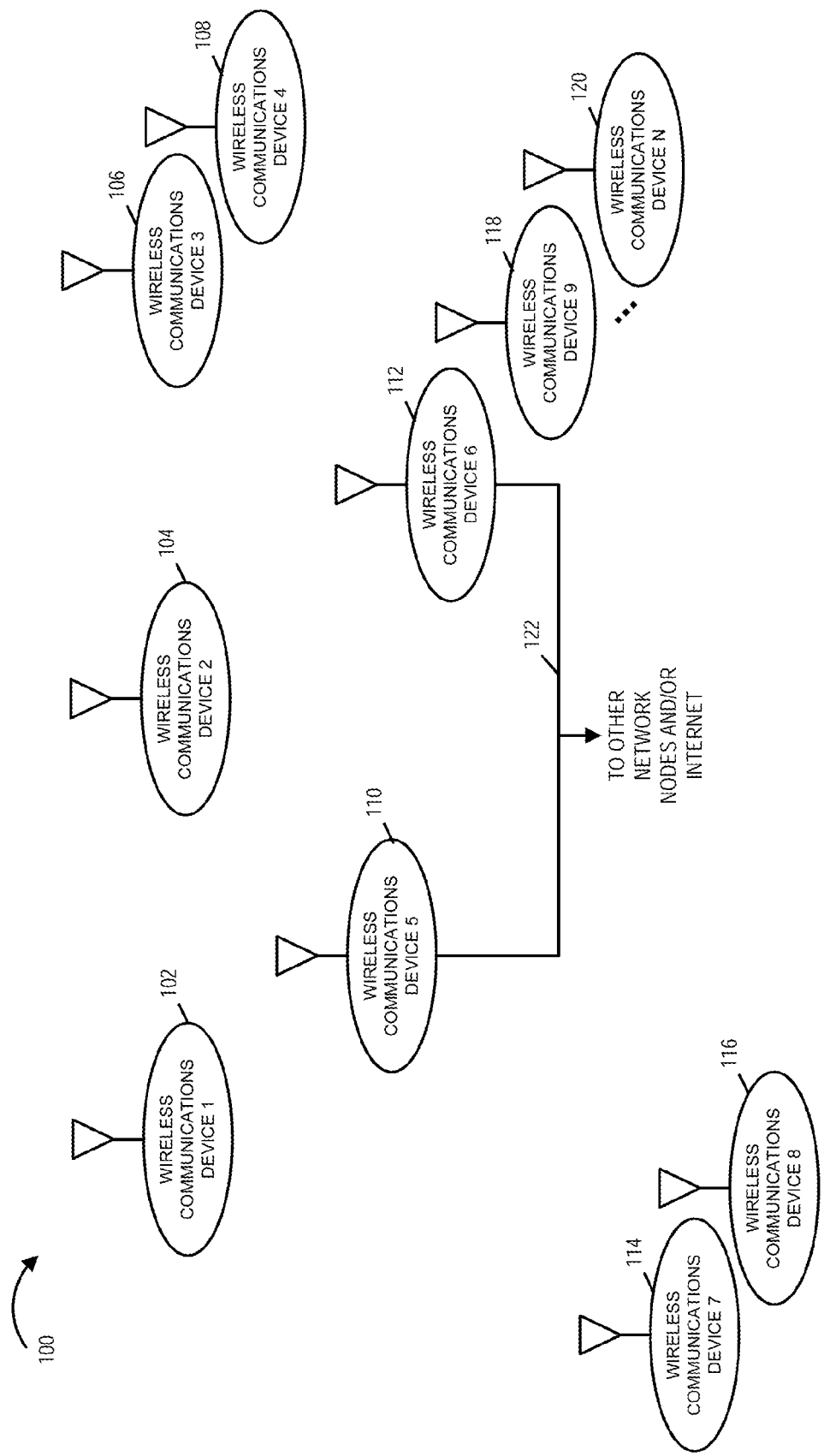
FIG. 1 is a drawing of an exemplary wireless communications system in accordance with an exemplary embodiment.

FIG. 1 is a drawing of an exemplary wireless communications system 100, e.g., a peer to peer wireless system, in accordance with an exemplary embodiment. Exemplary wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, . . . , wireless communications device N 120. Wireless communications devices (110, 112), e.g., access points, are coupled to other network nodes and/or the Internet via backhaul network 122. At least some of the wireless communications devices (102, 104, 106, 108, 114, 116, 118, 120) are mobile nodes, e.g., battery powered handheld mobile wireless devices, which may move throughout the network.

Wireless communications system 100 supports communications over different ranges in the system 100. In some embodiments, the wireless peer to peer system implements a peer to peer timing structure including some resources allocated for short range communications and some resources allocated for long range communications. For example, one exemplary recurring peer to peer timing structure includes a first block of air link resources dedicated to carry short range peer discovery signals and a second block of air link resources dedicated to carry long range peer discovery signals. In some embodiments, a short range peer discovery segment is different than a long range peer discovery segment. In some embodiments, a short range peer discovery basic air link resource unit, e.g., Orthogonal Frequency Division Multiplexing (OFDM) tone-symbol, is different than a long range peer discovery basic air link resource unit.

As another example, one exemplary recurring peer to peer timing structure includes a first block of air link resources dedicated to carry short range peer paging signals and a second block of air link resources dedicated to carry long range peer paging signals. In some embodiments, a short range paging segment is different than a long range peer discovery segment. In some embodiments, a short range paging basic air link resource unit, e.g., OFDM tone-symbol, is different than a long range paging basic air link resource unit.

Figure 2:
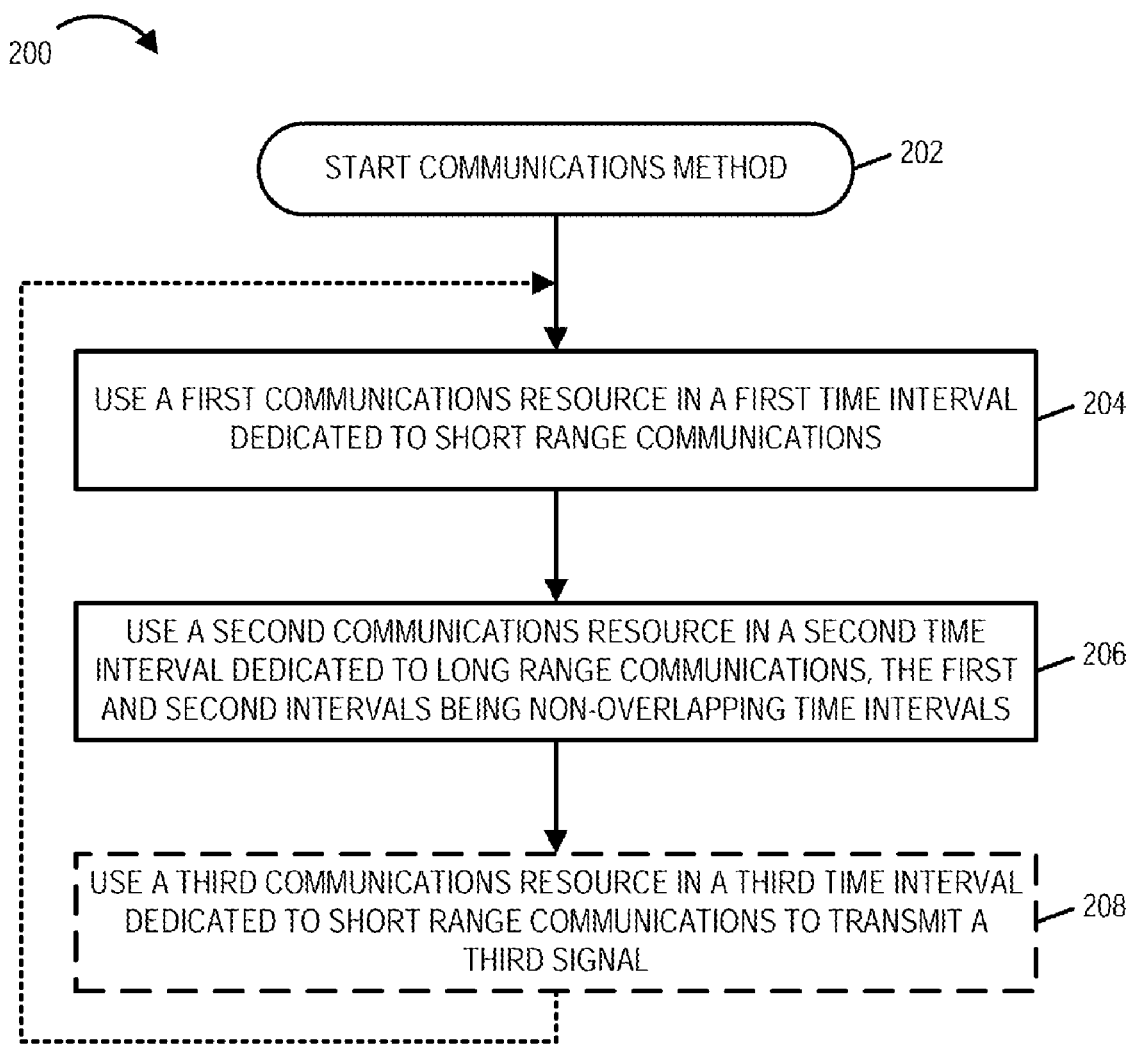
FIG. 2 is a flowchart of an exemplary method of implementing a communications method in accordance with some exemplary embodiments.

FIG. 2 is a flowchart 200 of an exemplary method of implementing a communications method in accordance with some exemplary embodiments. The communications device implementing the method of flowchart 200 of FIG. 2 is, e.g., one of the communications devices of system 100 of FIG. 1. Operation starts in step 202 where the communications device is powered on and initialized and proceeds to step 204. In step 204 the communications device uses a first communications resource in a first time interval dedicated to short range communications. Operation proceeds from step 204 to step 206. In step 206 the communications device uses a second communications resource in a second time interval dedicated to long range communications, the first and second intervals being non-overlapping time intervals.

In some embodiments, the first and second communications resources are first and second sets of tone-symbols, respectively, where a tone-symbol is the air link resource of one tone for one symbol transmission time interval.

In some embodiments, the first and second communications resources differ in time duration. In some such embodiments, the first communications resource is a first tone-symbol and the second communications resources is a second tone-symbol. In one such embodiment, the first tone-symbol has a first symbol time which is shorter than a second symbol time of the second tone-symbol.

In various embodiments, the first and second communications resources are first and second tone-symbols, respectively, and the width of the first and second tone-symbols in frequency are different. In some embodiments, the first tone-symbol is wider in frequency than the second tone-symbol. In some such embodiments, the first tone-symbol width in frequency divided by the first tone-symbol width in frequency is an integer of two. This facilitates a hardware implementation.

In some embodiments the first and second time intervals are peer discovery time intervals. In some other embodiments, the first and second time intervals are paging intervals.

In some embodiments, using a first communications resource includes at least one of transmitting and receiving a signal on the first communications resource and using a second communications resource includes at least one of transmitting and receiving a signal on the second communications resource.

In some embodiments, operation proceeds from step 206 to optional step 208. In step 208 the communications device uses a third communications resource in a third time interval dedicated to short range communications to transmit a third signal. In some embodiments including step 208, using a first communications resource includes receiving a signal on the first communications resource and using a second communications resource includes receiving a signal on the second communications resource. In some such embodiments, the communications device supports reception on both short and long range dedicated resources, but supports transmission on short range dedicated resources. In some embodiments, the communications device supports reception on both short and long range dedicated resources, but supports transmission on one of short range and long range dedicated resources.

Figure 3:
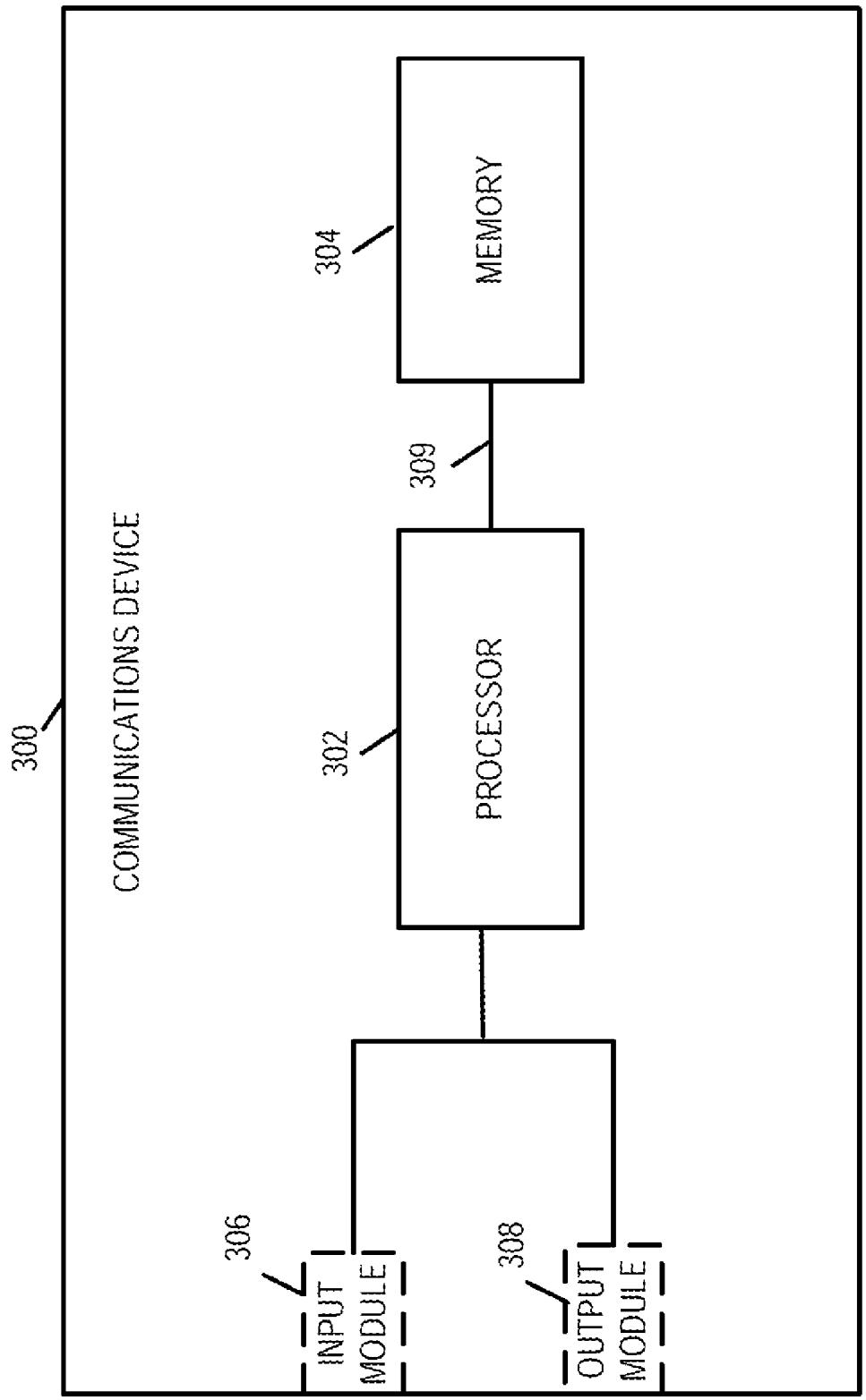
FIG. 3 is a drawing of an exemplary communications device, in accordance with an exemplary embodiment.

FIG. 3 is a drawing of an exemplary communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: use a first communications resource in a first time interval dedicated to short range communications; and use a second communication resource in a second time interval dedicated to long range communications, the first and second time intervals being non-overlapping time intervals. In some embodiments, the first and second communications resources are first and second sets of tone-symbols, respectively. In some embodiments the first and second time intervals are peer discovery time intervals. In some embodiments, the first and second time intervals are paging intervals. The first and second communications resources, in at least some embodiments, differ in time duration.

In various embodiments, the first communication resource is a first tone-symbol and said second communications resource is a second tone-symbol. In some such embodiments, the first tone-symbol has a first symbol time which is shorter than a second symbol time of the second tone-symbol.

In some embodiments, the first and second communications resources are first and second tone-symbols, respectively, and the width of the first and second tone-symbols in frequency are different. In some such embodiments, the first tone-symbol is wider in frequency than the second tone-symbol. In various embodiments, the first tone-symbol width in frequency divided by the second tone-symbol width in frequency is an integer multiple of two.

Processor 302 is configured to perform at least one of transmitting and receiving a signal on the first communications resource as part of being configured to use a first communications resource; and processor 302 is also configured to perform at least one of transmitting and receiving a signal on the second communications resource as part of being configured to use a second communications resource. In some embodiments, processor 302 is configured: to receive a first signal on the first communications resource as part of being configured to use a first communications resource; and receive a second signal on the second communications resource as part of being configured to use a second communications resource. In some such embodiments processor 302 is further configured to use a third communications resource in a third time interval dedicated to short range communications to transmit a third signal.

Figure 4:
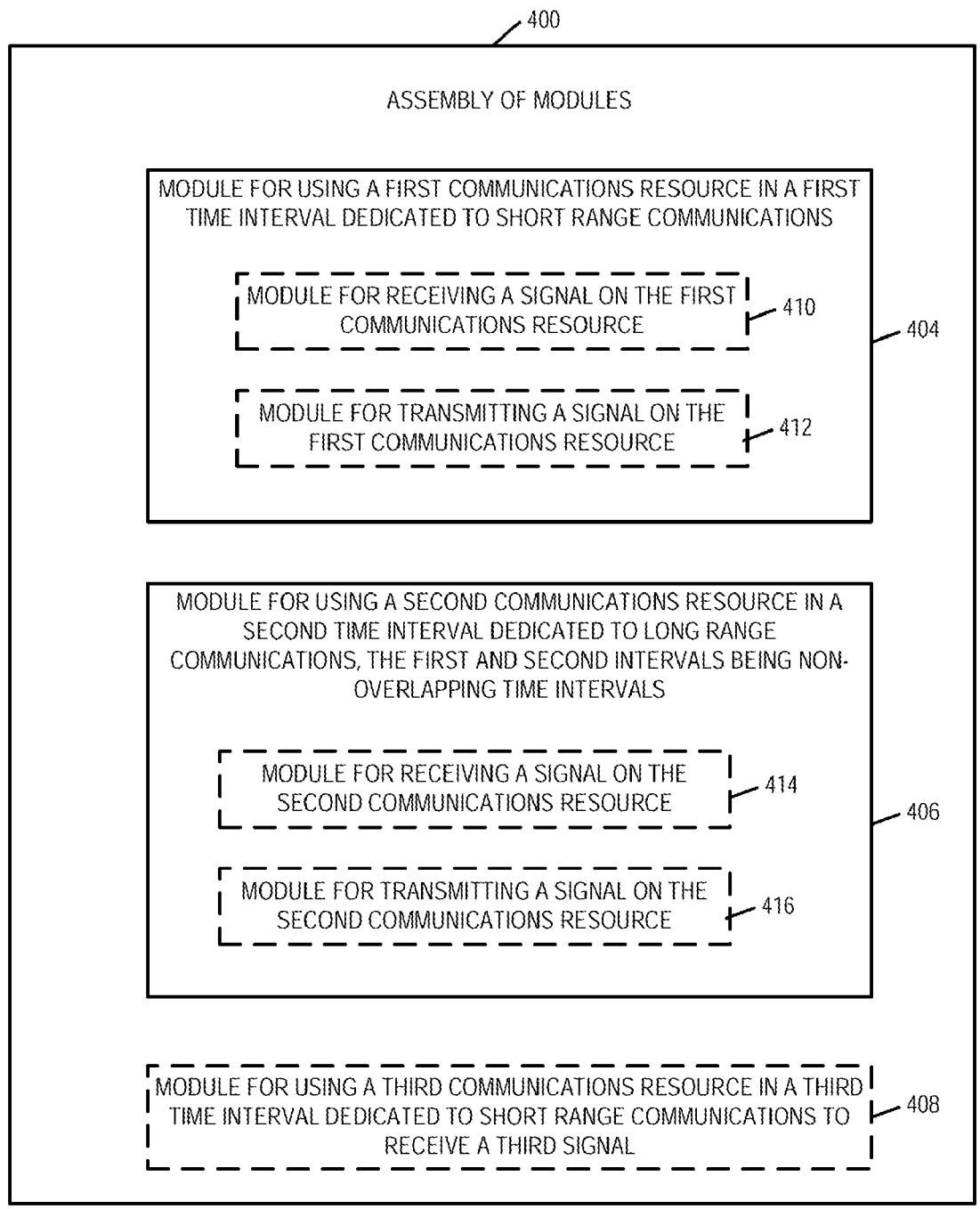
FIG. 4 is an assembly of modules which can, and in some embodiments is, used in the communications device illustrated in FIG. 3.

FIG. 4 is an assembly of modules 400 which can, and in some embodiments is, used in the communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for using a first communications resource in a first time interval dedicated to short range communications and a module 406 for using a second communications resource in a second time interval dedicated to long range communications, the first and the second intervals being non-overlapping time intervals.

Module 404 includes at least one of a module 410 for receiving a signal on the first communications resource and a module 412 for transmitting a signal on the first communications resource. Module 406 includes at least one of a module 414 for receiving a signal on the second communications resource and a module 416 for transmitting a signal on the second communications resource.

In some embodiments, the first and second communications resources are first and second sets of tone-symbols, respectively. The first and second communications resources, in some embodiments, differ in time duration. In some embodiments, the first and second time intervals are peer discovery time intervals. In various embodiments, the first and second time intervals are paging intervals.

In some embodiments the first communications resource is a first tone-symbol and the second communications resource is a second tone-symbol. In some such embodiments, the first tone-symbol has a first symbol time which is shorter than a symbol time of the second tone-symbol.

In some embodiments, in which the first and second communications resources are first and second tone-symbols, respectively, the width of the first and second tone-symbols in frequency is different. In some such embodiments, the first tone symbol is wider in frequency than the second tone-symbol. In some such embodiments, the first tone-symbol width in frequency divided by the second tone-symbol width in frequency is an integer of two.

In some embodiments, assembly of modules 400 includes a module for using a third communications resource in a third time interval dedicated to short range communications to receive a third signal. In some embodiments the communications device supports both short and long range reception and short range transmission. For example, the communications device includes module 404 including module 410 which supports short range reception, module 406 including module 414 which supports long range reception, and module 408 which supports short range transmissions.

Figure 5:
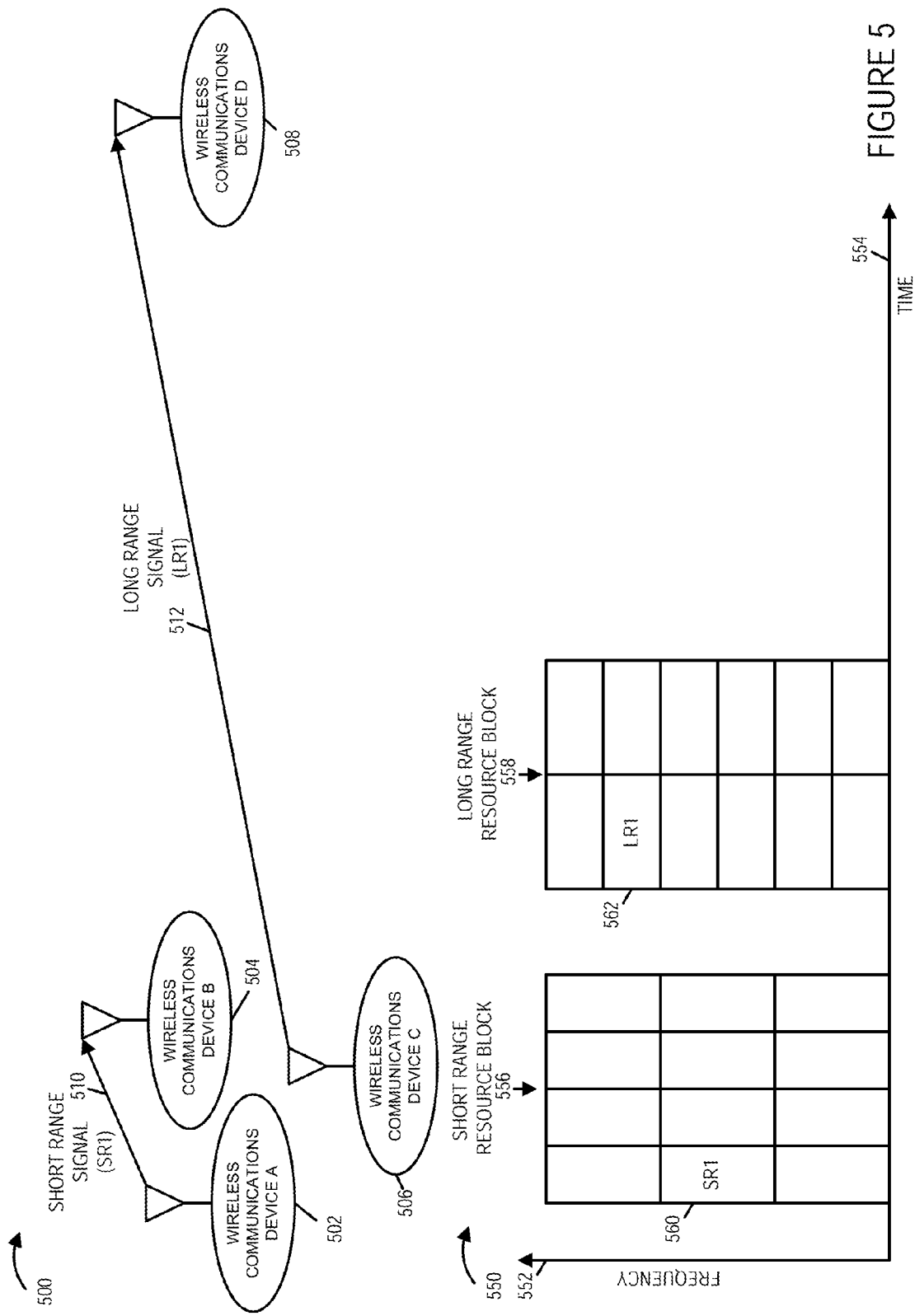
FIG. 5 includes a drawing illustrating exemplary signaling and air resource usage in accordance with an exemplary embodiment.

FIG. 5 includes a drawing 500 illustrating exemplary signaling and air resource usage in accordance with an exemplary embodiment. Drawing 500 includes a plurality of wireless communications devices (wireless communications device A 502, wireless communications device B 504, wireless communications device C 506, wireless communications device D 508). Wireless communications device A 502 would like its signal to be received and successfully decoded by wireless communications device B 504 which is situated in relatively close range. Wireless communications device C 506 would like its signal to be received and successfully decoded by wireless communications device D 508 which is situated in relatively long range. The signals to be communicated are, e.g., one of peer discovery signals and paging signals.

FIG. 5 also includes drawing 550 illustrating an exemplary frequency vs time plot. Vertical axis 552 represents frequency while horizontal axis 554 represents time. Consider that the communications devices (502, 504, 506, 508) are implementing a peer to peer recurring timing structure including short range resource block 556 and long range resource block 558, which are non-overlapping in time. The exemplary short range resource block 556 includes 12 short range transmission segments, and the long range transmission block 558 includes 12 long range transmission segments. Consider that each transmission segment includes a predetermined number of OFDM tone-symbols; however, the tone-symbols of a short range transmission segment are different from the tone-symbols of a long range transmission segment.

For example, consider that exemplary short range transmission segment 560 of short range resource block 556 includes 8 consecutive first size tone-symbols, and exemplary long range transmission segment 562 includes 8 consecutive second size tone-symbols. Further consider that a first size tone-symbol has a frequency width which is twice the frequency width of a second size tone-symbol, and a second size tone-symbol has a symbol transmission time interval which is twice the symbol transmission time interval of a first size tone-symbol.

In the example of FIG. 5 consider that wireless communications device A 502 uses short range transmission segment 560 to transmit short range signal SR1 510, while wireless communications device C 506 uses long range transmission segment 562 to transmit long range signal LR1 512.

Wireless communications device B 504 which is monitoring the short range resources block 556 is able to received signal SR1 510 and decode the information being communicated. Wireless communications device D 508 which is monitoring long range resource block 558 is able to receive and signal LR1 512 and decode the information being communicated.

Note that if the short and long range signals had instead been communicated during the same transmission time interval, there is the possibility that the front end receiver of device B 504, which is situated close to long range transmitter device C 506, would be de-sensed or saturated by the concurrent long range transmissions and would be unable to successfully recover the information being communicated in short range signal SR1 510.

Figure 6:
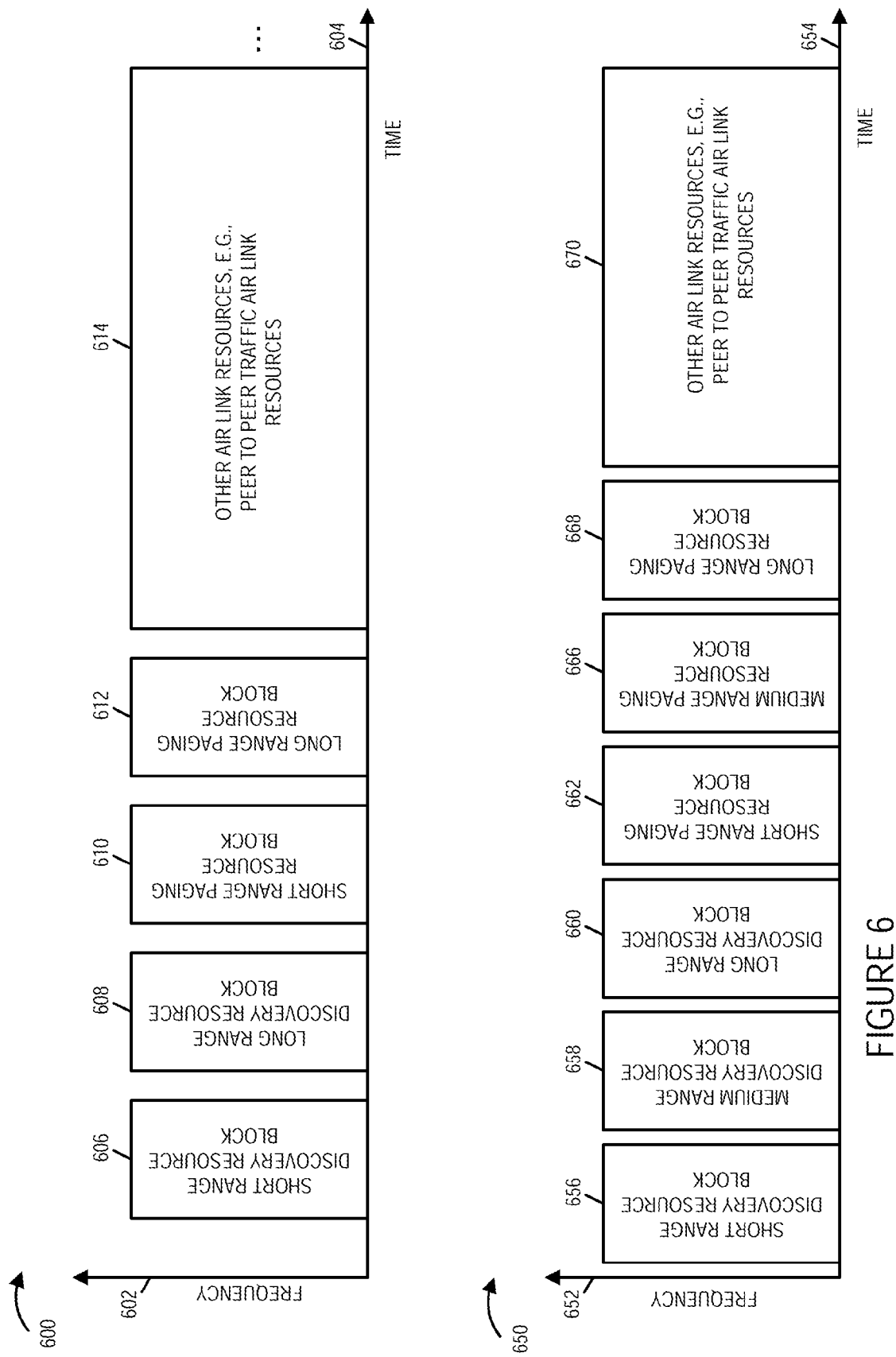
FIG. 6 illustrates exemplary peer to peer recurring timing structures used in various embodiments.

FIG. 6 illustrates exemplary peer to peer recurring timing structures used in various embodiments. Drawing 600 illustrates a first exemplary peer to peer timing structure. Vertical axis 602 represents frequency, while horizontal axis 604 represents time. The first peer to peer recurring timing structure includes a short range discovery resource block 606, a long range discovery resource block 608, a short range paging resource block 610, a long range paging resource block 612, and other air link resources 614, e.g., peer to peer traffic air link resources. The symbol duration of symbols in a long range resource block is larger than the symbol duration of symbols in a short range block. In some such embodiments, the tone width of tones in a long range resource block is smaller than the tone width of tones in a short range resource block. In some embodiments, the transmission power of signals in a short range discovery resource block are less than the transmission power of signals in a long range discovery resource block. In some embodiments, the transmission power of signals in a short range paging resource block are less than the transmission power of signals in a long range paging resource block.

Drawing 650 also illustrates a second exemplary peer to peer timing structure. Vertical axis 652 represents frequency, while horizontal axis 654 represents time. The second peer to peer recurring timing structure includes a short range discovery resource block 656, a medium range discovery resource block 658, a long range discovery resource block 660, a short range paging resource block 662, a medium range paging resource block 666, a long range paging resource block 668 and other air link resources 670, e.g., peer to peer traffic air link resources.

In some such embodiments, with regard to ranges, long range is approximately 1200 m, medium range is approximately 100 m and short range is approximately 10 m. The symbol duration of symbols in a medium range resource block is larger than the symbol duration of symbols in a short range block, and the symbol duration of symbols in a medium range block is less than the symbol duration of symbols in a long range block. In some such embodiments, the tone width of tones in a medium range resource block is smaller than the tone width of tones in a short range block, and the tone width of tones in a medium range block is greater than the tone width of tones in a long range block. In some embodiments, the transmission power of signals in a short range discovery resource block are less than the transmission power of signals in a medium range discovery resource block, and the transmission power of signals in a medium range discovery resource block are less than the transmission power of signals in a long range discovery resource block. In some embodiments, the transmission power of signals in a short range paging resource block are less than the transmission power of signals in a medium range paging resource block, and the transmission power of signals in a medium range paging resource block are less than the transmission power of signals in a long range paging resource block.

In some embodiments, the timing structure includes more than three range levels, each range level having a different resource block, and resource blocks corresponding to different ranges are non-overlapping in time. In some embodiments, basic transmission units, e.g., OFDM tone-symbols, corresponding to the different range based resource blocks have different characteristics.

In some embodiments, the peer discovery air link resources are used to communicate one or more of: a device identifier, a user identifier, a group identifier, a site identifier, a location identifier, a business identifier, an application identifier, a request for a service, a request for a product, a request for information, an offer of a service, an offer of a product, an offer of information. In some embodiments, the paging air link resources are used to communicate device and/or user identifiers as part of paging signals.

In some embodiments, the traffic air link resources may be used to communicate traffic data such as, for example, voice data, text data, and/or user application data. In some embodiments, the basic transmission unit, e.g., OFDM tone-symbol, used to communicate traffic data has the same characteristics, e.g., frequency width and time duration, regardless of whether the traffic data being communicated corresponds to long range, medium range, or short range communications.

Figure 7:
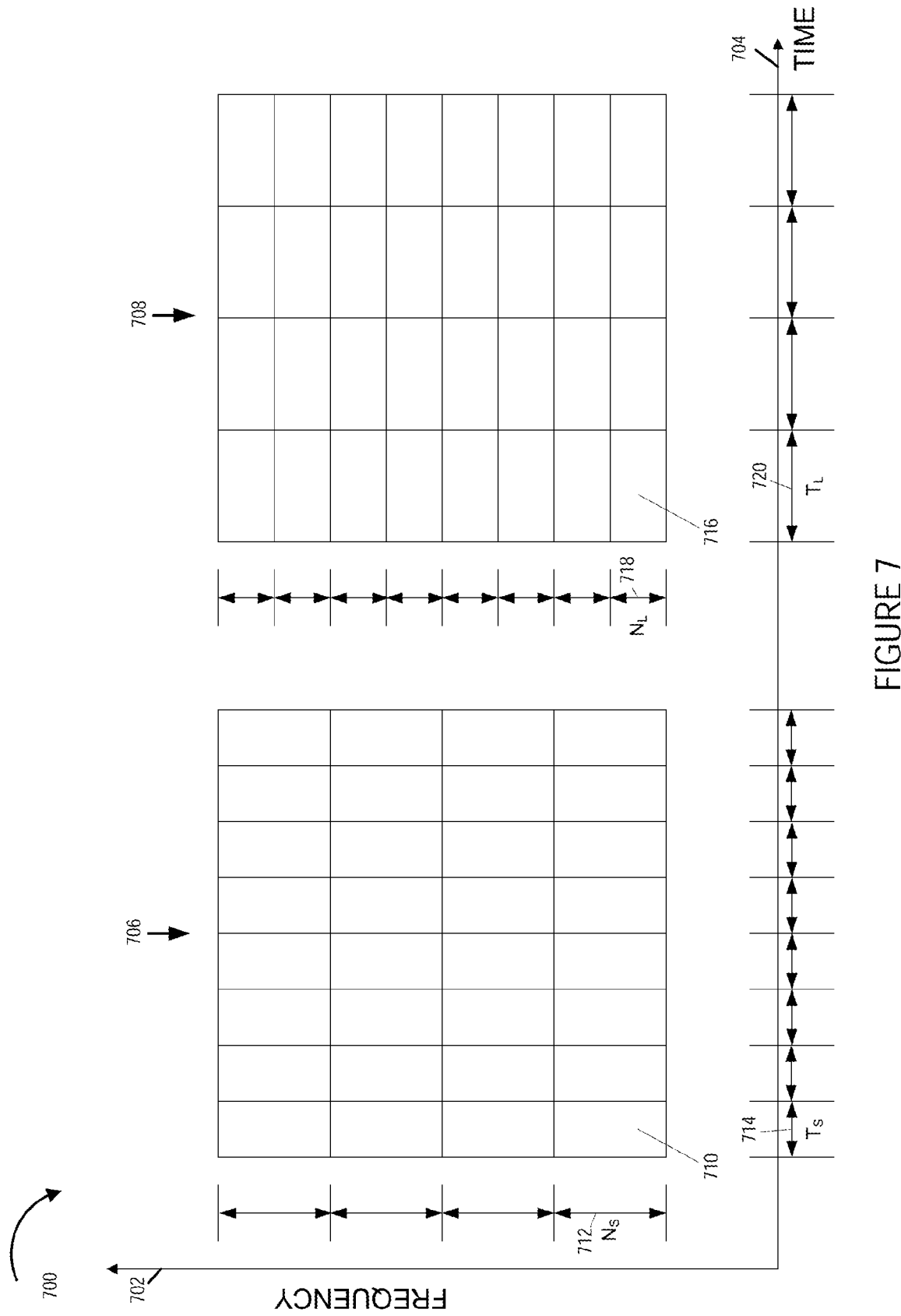
FIG. 7 is a drawing of a frequency vs time plot illustrating a portion of an exemplary recurring peer to peer timing structure used in some embodiments.
Figure 8A:
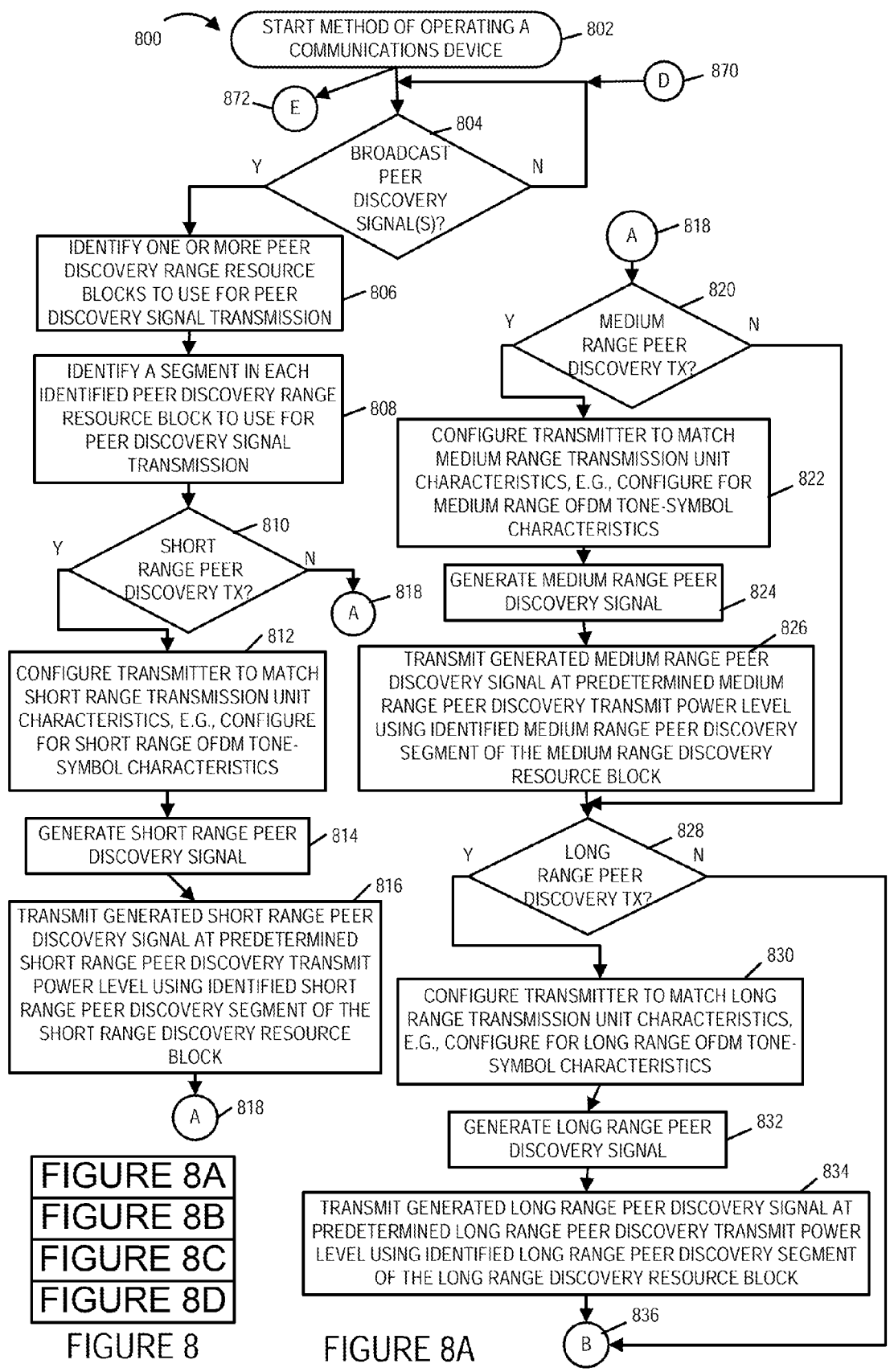
FIG. 8A is a first part of a flowchart of an exemplary method of operating a wireless communications device in accordance with an exemplary embodiment.
Figure 8B:
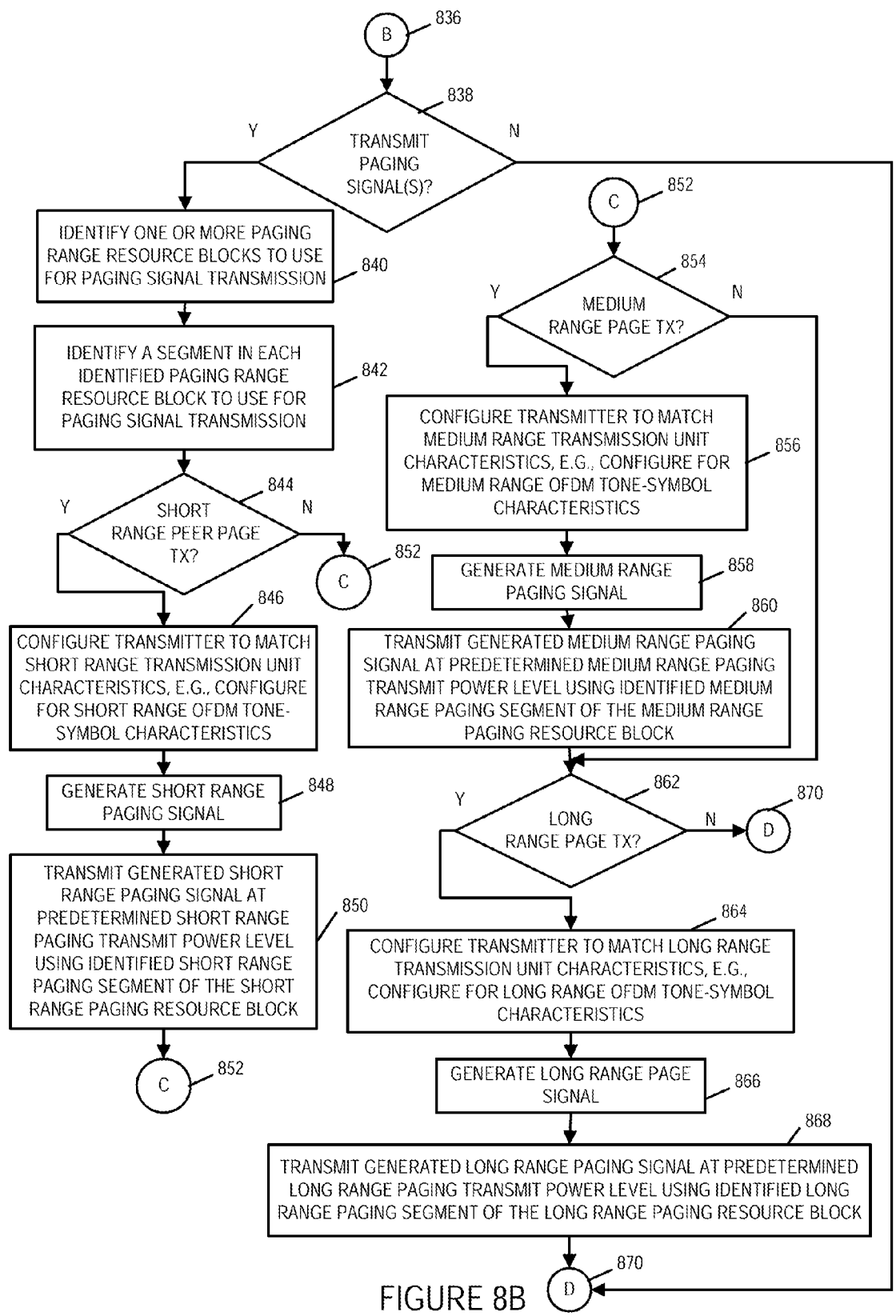
FIG. 8B is a second part of a flowchart of an exemplary method of operating a wireless communications device in accordance with an exemplary embodiment.
Figure 8C:
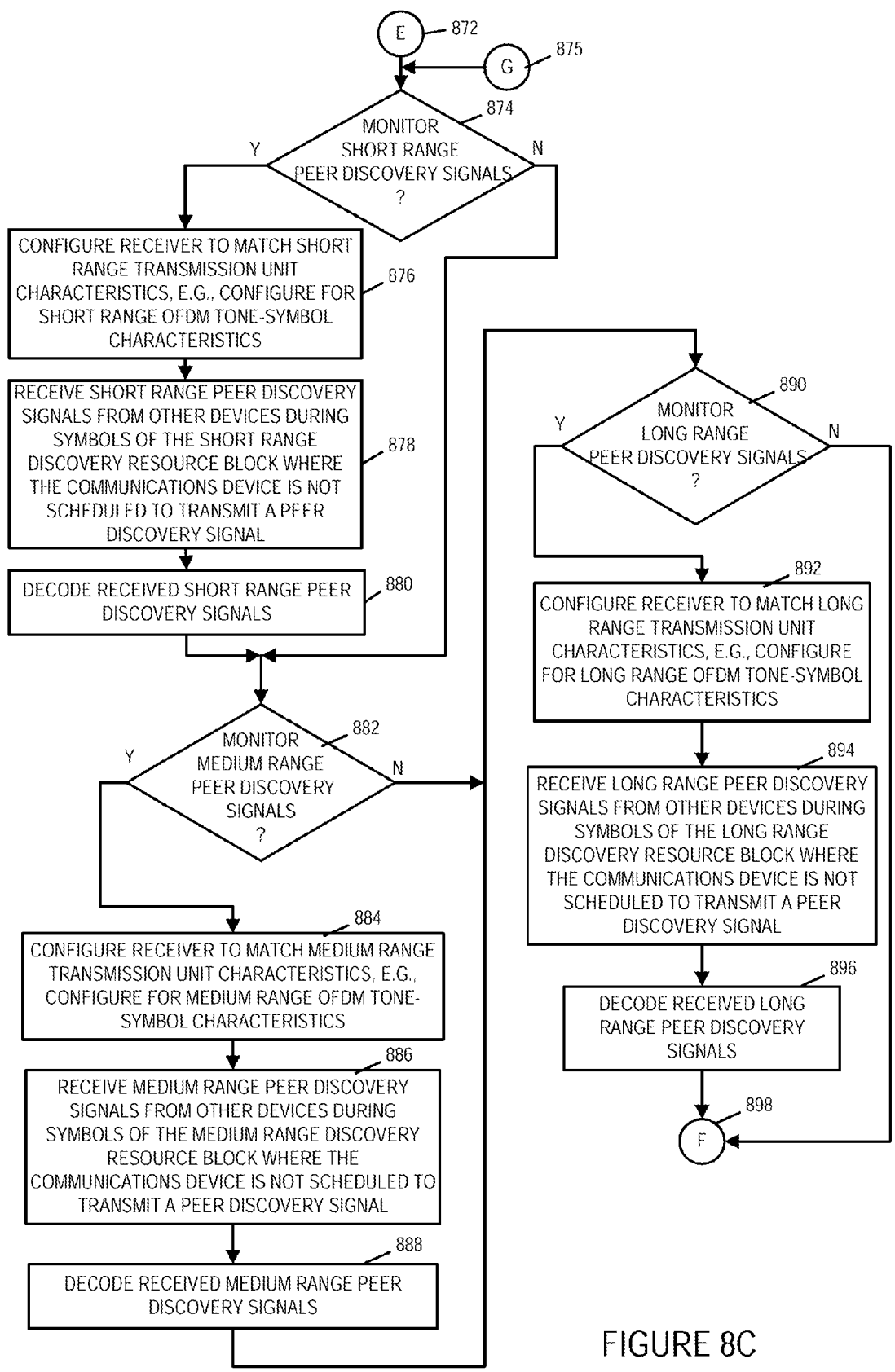
FIG. 8C is a third part of a flowchart of an exemplary method of operating a wireless communications device in accordance with an exemplary embodiment.
Figure 8D:
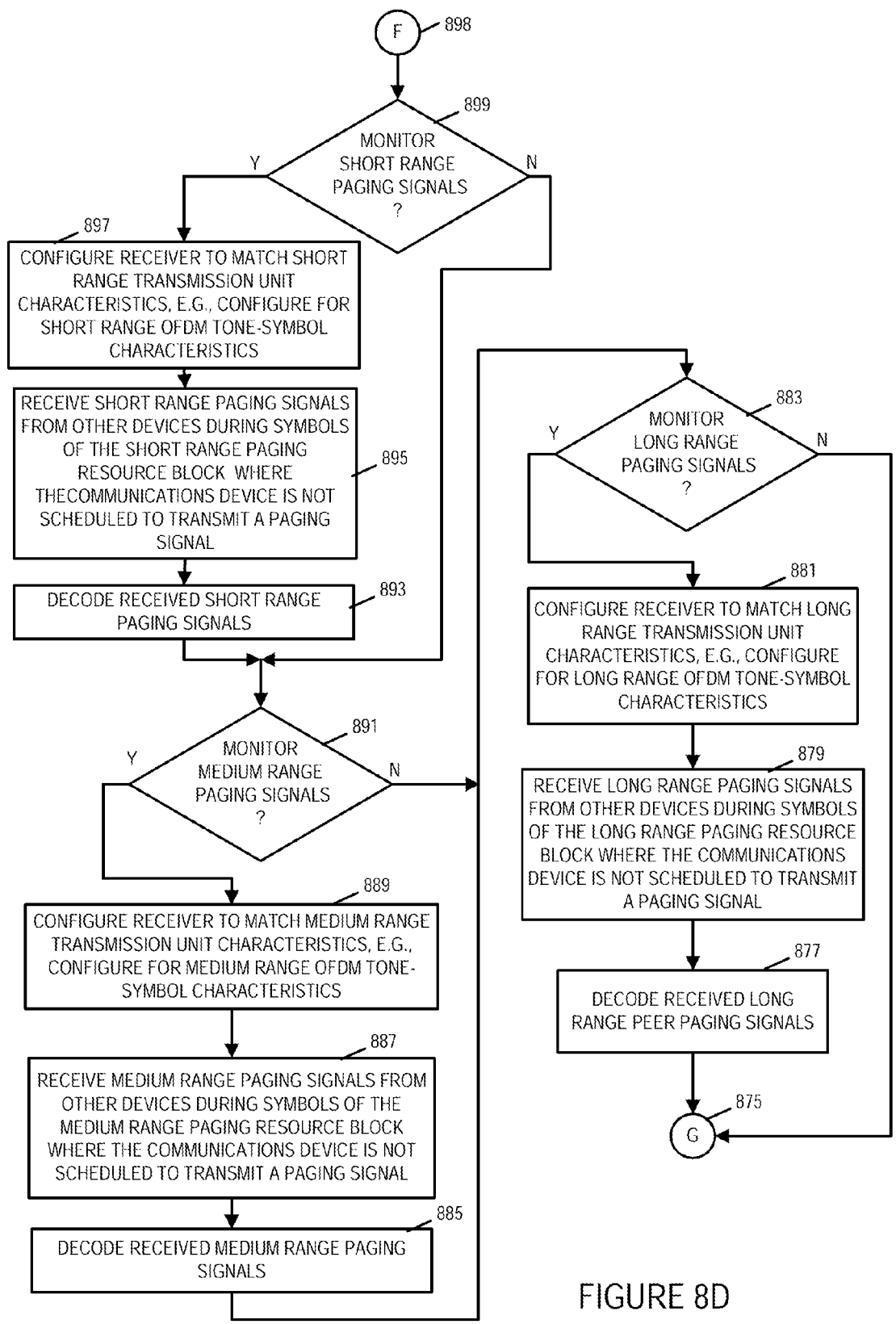
FIG. 8D is a fourth part of a flowchart of an exemplary method of operating a wireless communications device in accordance with an exemplary embodiment.

FIG. 7 is a drawing of a frequency vs time plot 700 illustrating a portion of an exemplary recurring peer to peer timing structure used in some embodiments. Exemplary plot 700 includes a vertical axis 702 representing frequency and a horizontal axis 704 representing time. The air link resources of the timing structure include a short range peer discovery resource block 706 and a long range peer discovery resource block 708. Short range peer discovery block 706 is, e.g., short range peer discovery block 606 of FIG. 6, and long range peer discovery block 708 of FIG. 7 is, e.g., long range peer discovery block 608 of FIG. 6. Short range peer discovery resource block 706 includes 32 OFDM tone-symbols. An OFDM tone-symbol of short range peer discovery resource block 706 such as exemplary OFDM tone-symbol 710 has a frequency width=$N_S$ 712 and a symbol transmission time interval=Ts 714. Long range peer discovery resource block 708 includes 32 OFDM tone-symbols. An OFDM tone-symbol of long range peer discovery resource block 708 such as exemplary OFDM tone-symbol 716 has a frequency width=$N_L$ 718 and a symbol transmission time interval=$T_L$ 720. Ts is smaller than $T_L$ and $N_S$ is larger than $N_L$. In some embodiments $T_L=2T_S$ and $N_S=2 N_L$. In some embodiments, $T_L/T_S$ is an integer multiple of two. In some embodiments, $N_S/N_L$ is an integer multiple of two.

In some embodiments, a wireless communications device uses a single OFDM tone of a discovery block to transmit a discovery signal in that communications block. In some embodiments, a wireless terminal uses a predetermined fixed size set of multiple OFDM tones to transmit a discovery signal in a communications block.

Although illustrated in FIG. 7 for the example of discovery air link resources, the same approach can be and sometimes is applied with respect to paging air link resources. The approach presented in FIG. 7 can be, and sometimes is extended to embodiments, with more than two different types of peer discovery paging blocks or more than two types of paging blocks, e.g., such as the three level range embodiment shown in drawing 650 of FIG. 6.

FIG. 8, comprising the combination of FIG. 8A, FIG. 8B, FIG. 8C and FIG. 8D, is a flowchart 800 of an exemplary method of operating a wireless communications device in accordance with an exemplary embodiment. The exemplary wireless communications device is, e.g., one of the wireless communications device of system 100 of FIG. 1. Operation starts in step 802 where the communications device is powered on and initialized and proceeds to step 804 and to step 874 via connecting node E 872.

In step 804 the wireless communications determines whether or not it is to broadcast peer discovery signal(s) in the upcoming set of peer discovery resource blocks. If the wireless communications device determines that it is to broadcast peer discovery signal(s), operation proceeds from step 804 to step 806. However, if the wireless communications device determines that it is not to broadcast any peer discovery signals in the upcoming set of peer discovery resource blocks, then operation proceeds from the output of step 804 to the input of step 804 for another determination corresponding to the next peer discovery broadcast opportunity.

Returning to step 806, in step 806 the wireless communications device identifies one or more peer discovery range resource blocks to use for peer discovery signal transmission. In this example, the peer to peer timing structure includes a short range peer discovery resource block, a medium range peer discovery resource block and a long range peer discovery resource block, which are non-overlapping in time. Thus, in step 806 the communications device identifies one or more of the three different peer discovery resource blocks to use. Operation proceeds from step 806 to step 808.

In step 808 the wireless communications device identifies a segment in each identified peer discovery range resources block to use for peer discovery signal transmission. Operation proceeds from step 808 to step 810.

In step 810 the wireless communications device controls operation to proceed to step 812 if the device is to transmit a short range peer discovery signal. If the wireless communications device is not to transmit a short range peer discovery signal then, operation proceeds from step 810 via connecting node A 818 to step 820.

Returning to step 812, in step 812 the wireless communications device configures its transmitter to match short range transmission unit characteristics. For example, the wireless communications device configures its transmitter for short range OFDM tone-symbol characteristics. Operation proceeds from step 812 to step 814 in step 814 the wireless communications device generates a short range peer discovery signal. Then, in step 816 the wireless communications device transmits the generated short range peer discovery signal at a predetermined short range peer discovery transmit power level using the identified short range peer discovery segment of the short range peer discovery resource block. Operation proceeds from step 816 via connecting node A 818 to step 820.

In step 820 the wireless communications device controls operation to proceed to step 822 if the device is to transmit a medium range peer discovery signal. If the wireless communications device is not to transmit a medium range peer discovery signal then, operation proceeds from step 822 to step 828.

Returning to step 822, in step 822 the wireless communications device configures its transmitter to match medium range transmission unit characteristics. For example, the wireless communications device configures its transmitter for medium range OFDM tone-symbol characteristics. Operation proceeds from step 822 to step 824 in step 824 the wireless communications device generates a medium range peer discovery signal. Then, in step 826 the wireless communications device transmits the generated medium range peer discovery signal at a predetermined medium range peer discovery transmit power level using the identified medium range peer discovery segment of the medium range peer discovery resource block. Operation proceeds from step 826 to step 828.

In step 828 the wireless communications device controls operation to proceed to step 830 if the device is to transmit a long range peer discovery signal. If the wireless communications device is not to transmit a long range peer discovery signal then, operation proceeds from step 828 to step 838 via connecting node B 836.

Returning to step 830, in step 830 the wireless communications device configures its transmitter to match long range transmission unit characteristics. For example, the wireless communications device configures its transmitter for long range OFDM tone-symbol characteristics. Operation proceeds from step 830 to step 832. In step 832 the wireless communications device generates a long range peer discovery signal. Then, in step 834 the wireless communications device transmits the generated long range peer discovery signal at a predetermined long range peer discovery transmit power level using the identified long range peer discovery segment of the long range peer discovery resource block. Operation proceeds from step 834 to step 838 via connecting node B 836.

In step 838 the wireless communications determines whether or not it is to transmit paging signal(s) in the upcoming set of paging resource blocks. If the wireless communications device determines that it is to transmit paging signal(s), operation proceeds from step 838 to step 840. However, if the wireless communications device determines that it is not to transmit any paging signals in the upcoming set of paging resource blocks, then operation proceeds from the output of step 838 to the input of step 804, via connecting node D 870 for another determination corresponding to the next peer discovery transmission opportunity in the recurring timing structure.

Returning to step 840, in step 840 the wireless communications device identifies one or more paging range resource blocks to use for paging signal transmission. In this example, the peer to peer timing structure includes a short range paging resource block, a medium range paging resource block and a long range paging resource block, which are non-overlapping in time. Thus, in step 840 the communications device identifies one or more of the three different paging resource blocks to use. Operation proceeds from step 840 to step 842.

In step 842 the wireless communications device identifies a segment in each identified paging range resource block to use for paging signal transmission. Operation proceeds from step 842 to step 844.

In step 844 the wireless communications device controls operation to proceed to step 846 if the device is to transmit a short range paging signal. If the wireless communications device is not to transmit a short range paging signal then, operation proceeds from step 844 via connecting node C 852 to step 854.

Returning to step 846, in step 846 the wireless communications device configures its transmitter to match short range transmission unit characteristics. For example, the wireless communications device configures its transmitter for short range OFDM tone-symbol characteristics. Operation proceeds from step 846 to step 848. In step 848 the wireless communications device generates a short range paging signal. Then, in step 850 the wireless communications device transmits the generated short paging signal at a predetermined short range paging transmit power level using the identified short range paging segment of the short range peer paging resource block. Operation proceeds from step 850 via connecting node C 852 to step 854.

In step 854 the wireless communications device controls operation to proceed to step 856 if the device is to transmit a medium range paging signal. If the wireless communications device is not to transmit a medium range paging signal then, operation proceeds from step 854 to step 862.

Returning to step 856, in step 856 the wireless communications device configures its transmitter to match medium range transmission unit characteristics. For example, the wireless communications device configures its transmitter for medium range OFDM tone-symbol characteristics. Operation proceeds from step 856 to step 858. In step 858 the wireless communications device generates a medium range paging signal. Then, in step 860 the wireless communications device transmits the generated medium paging signal at a predetermined medium range paging transmit power level using the identified medium range peer paging segment of the medium range paging resource block. Operation proceeds from step 860 to step 862.

In step 862 the wireless communications device controls operation to proceed to step 864 if the device is to transmit a long range paging signal. If the wireless communications device is not to transmit a long range paging signal then, operation proceeds from step 862 to step 804 via connecting node D 870.

Returning to step 864, in step 864 the wireless communications device configures its transmitter to match long range transmission unit characteristics. For example, the wireless communications device configures its transmitter for long range OFDM tone-symbol characteristics. Operation proceeds from step 864 to step 866. In step 866 the wireless communications device generates a long range paging signal. Then, in step 866 the wireless communications device transmits the generated long range paging signal at a predetermined long range paging transmit power level using the identified long range paging segment of the long range paging resource block. Operation proceeds from step 868 to step 804 via connecting node D 870.

Returning to step 874, in step 874 the wireless communications devices determines whether or not it is to monitor short range peer discovery signals. If the wireless communications device decides that it is to monitor for short range peer discovery signals, then operation proceeds from step 874 to step 876; otherwise, operation proceeds from step 874 to step 882.

Returning to step 876, in step 876 the wireless communications device configures its receiver to match short range transmission unit characteristics. For example, the wireless communications device configures its receiver for short range OFDM tone-symbol characteristics. Operation proceeds from step 876 to step 878. In step 878 the wireless communications device receives short range peer discovery signals from other devices during symbols of the short range discovery resource block where the communications device is not scheduled to transmit a peer discovery signal. Operation proceeds from step 878 to step 880, in which the wireless communications device decodes the received short range peer discovery signals. Operation proceeds from step 880 to step 882.

In step 882 the wireless communications devices determines whether or not it is to monitor medium range peer discovery signals. If the wireless communications device decides that it is to monitor for medium range peer discovery signals, then operation proceeds from step 882 to step 884; otherwise, operation proceeds from step 882 to step 890.

Returning to step 884, in step 884 the wireless communications device configures its receiver to match medium range transmission unit characteristics. For example, the wireless communications device configures its receiver for medium range OFDM tone-symbol characteristics. Operation proceeds from step 884 to step 886. In step 886 the wireless communications device receives medium range peer discovery signals from other devices during symbols of the medium range discovery resource block where the communications device is not scheduled to transmit a peer discovery signal. Operation proceeds from step 886 to step 888, in which the wireless communications device decodes the received medium range peer discovery signals. Operation proceeds from step 888 to step 890.

In step 890 the wireless communications devices determines whether or not it is to monitor long range peer discovery signals. If the wireless communications device decides that it is to monitor for long range peer discovery signals, then operation proceeds from step 890 to step 892; otherwise, operation proceeds from step 890, via connecting node F 898 to step 899.

Returning to step 892, in step 892 the wireless communications device configures its receiver to match long range transmission unit characteristics. For example, the wireless communications device configures its receiver for long range OFDM tone-symbol characteristics. Operation proceeds from step 892 to step 894. In step 894 the wireless communications device receives long range peer discovery signals from other devices during symbols of the long range discovery resource block where the communications device is not scheduled to transmit a peer discovery signal. Operation proceeds from step 894 to step 896, in which the wireless communications device decodes the received long range peer discovery signals. Operation proceeds from step 896 via connecting node F 898 to step 899.

In step 899 the wireless communications devices determines whether or not it is to monitor for short range paging signals. If the wireless communications device decides that it is to monitor for short range paging signals, then operation proceeds from step 899 to step 897; otherwise, operation proceeds from step 899 to step 891.

Returning to step 897, in step 897 the wireless communications device configures its receiver to match short range transmission unit characteristics. For example, the wireless communications device configures its receiver for short range OFDM tone-symbol characteristics. Operation proceeds from step 897 to step 895. In step 895 the wireless communications device receives short range paging signals from other devices during symbols of the short range paging resource block where the communications device is not scheduled to transmit a paging signal. Operation proceeds from step 895 to step 893, in which the wireless communications device decodes the received short range paging signals. Operation proceeds from step 893 to step 891.

In step 891 the wireless communications device determines whether or not it is to monitor for medium range paging signals. If the wireless communications device decides that it is to monitor for medium range paging signals, then operation proceeds from step 891 to step 889; otherwise, operation proceeds from step 891 to step 883.

Returning to step 889, in step 889 the wireless communications device configures its receiver to match medium range transmission unit characteristics. For example, the wireless communications device configures its receiver for medium range OFDM tone-symbol characteristics. Operation proceeds from step 889 to step 887. In step 887 the wireless communications device receives medium range paging signals from other devices during symbols of the medium range paging resource block where the communications device is not scheduled to transmit a paging signal. Operation proceeds from step 887 to step 885, in which the wireless communications device decodes the received medium range paging signals. Operation proceeds from step 885 to step 883.

In step 883 the wireless communications device determines whether or not it is to monitor long range paging signals. If the wireless communications device decides that it is to monitor for long range paging signals, then operation proceeds from step 883 to step 881; otherwise, operation proceeds from step 883, via connecting node G 875 to step 874.

Returning to step 881, in step 881 the wireless communications device configures its receiver to match long range transmission unit characteristics. For example, the wireless communications device configures its receiver for long range OFDM tone-symbol characteristics. Operation proceeds from step 881 to step 879. In step 879 the wireless communications device receives long range paging signals from other devices during symbols of the long range paging resource block where the communications device is not scheduled to transmit a paging signal. Operation proceeds from step 879 to step 877, in which the wireless communications device decodes the received long range peer paging signals. Operation proceeds from step 877 via connecting node G 875 to step 874, e.g., corresponding to another iteration in the recurring timing structure.

In some embodiments, different types of devices use different range based resources with regard to at least some transmissions. In some embodiments, different applications use different range based resources with regard to at least some transmissions. In some embodiments, a device decides which range based resource or resources to use for at least some transmission as a function of battery power level information. In some embodiments, a device decides which range based resource or resources to use for at least some transmission as a function of congestion information. In some embodiments, a device may, and sometimes does, transmit the same information, e.g., the same discovery or paging information, using two different range based resources with the frequency of transmission being different for corresponding to two different range based resources. In some embodiments, a device decides which of a plurality of alternative range based resources to use for transmission as a function of recovered discovery information of interest.

Figure 9:
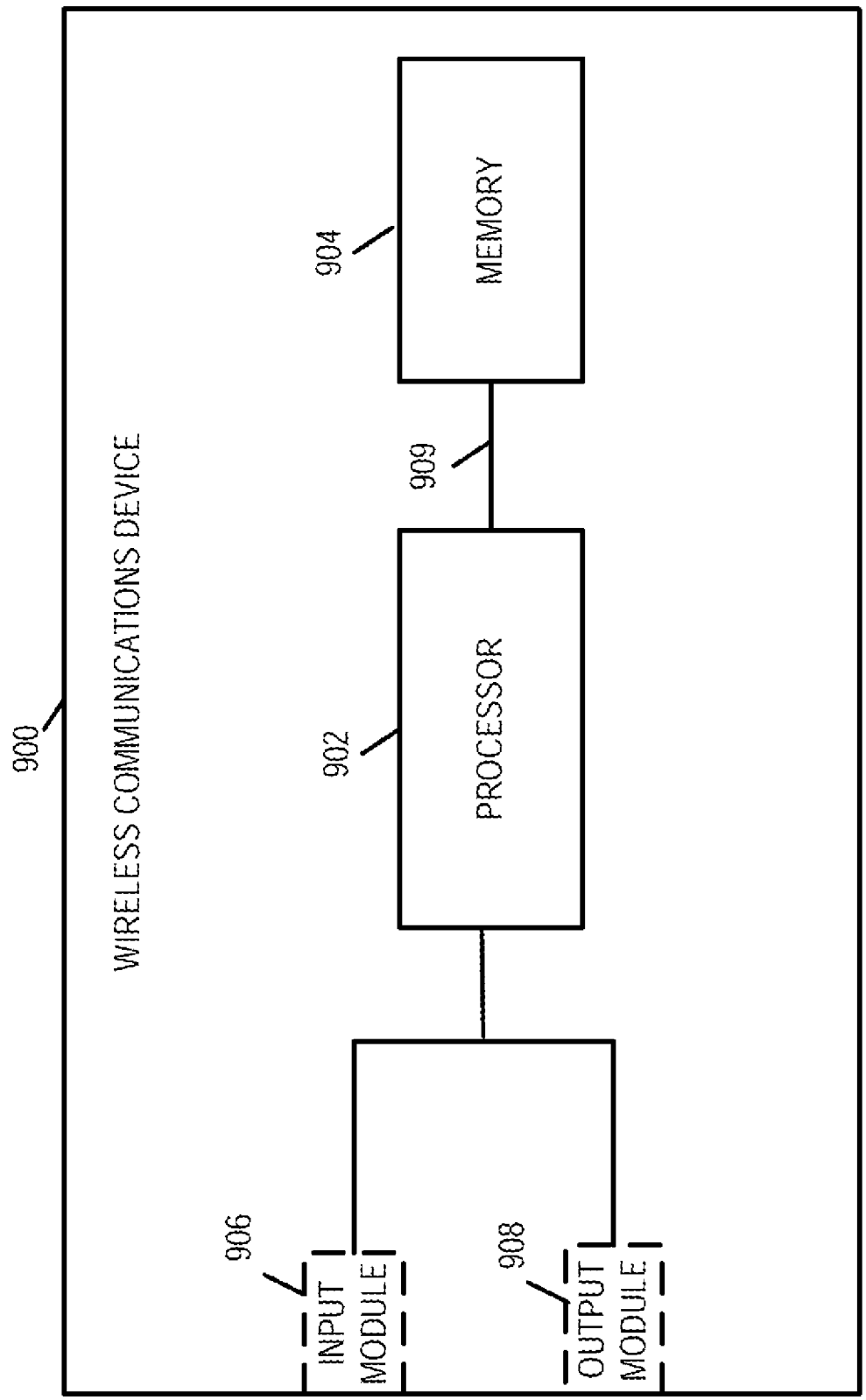
FIG. 9 is a drawing of an exemplary communications device, in accordance with an exemplary embodiment.

FIG. 9 is a drawing of an exemplary wireless communications device 900, in accordance with an exemplary embodiment. Exemplary wireless communications device 900 is, e.g., one of the wireless communications devices of FIG. 1. Exemplary wireless communications device 900 may, and sometimes does, implement a method in accordance with flowchart 800 of FIG. 8.

Wireless communications device 900 includes a processor 902 and memory 904 coupled together via a bus 909 over which the various elements (902, 904) may interchange data and information. Communications device 900 further includes an input module 906 and an output module 908 which may be coupled to processor 902 as shown. However, in some embodiments, the input module 906 and output module 908 are located internal to the processor 902. Input module 906 can receive input signals. Input module 906 can, and in some embodiments does, include a wireless receiver and/or a wired or optical input interface for receiving input. Output module 908 may include, and in some embodiments does include, a wireless transmitter and/or a wired or optical output interface for transmitting output.

Figure 10A:
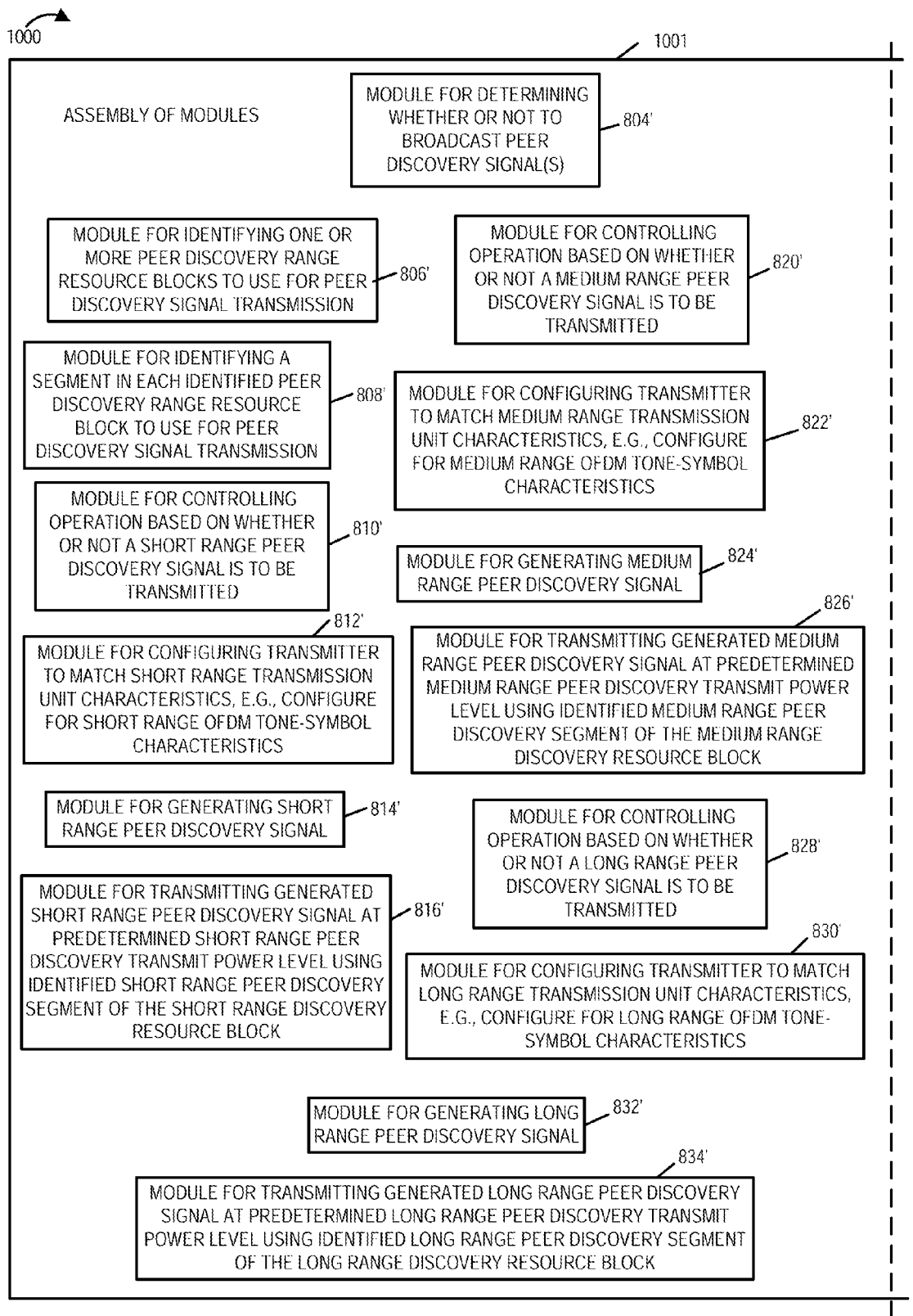
FIG. 10A is a first portion of an assembly of modules which can, and in some embodiments is, used in the communications device illustrated in FIG. 9.
Figure 10B:
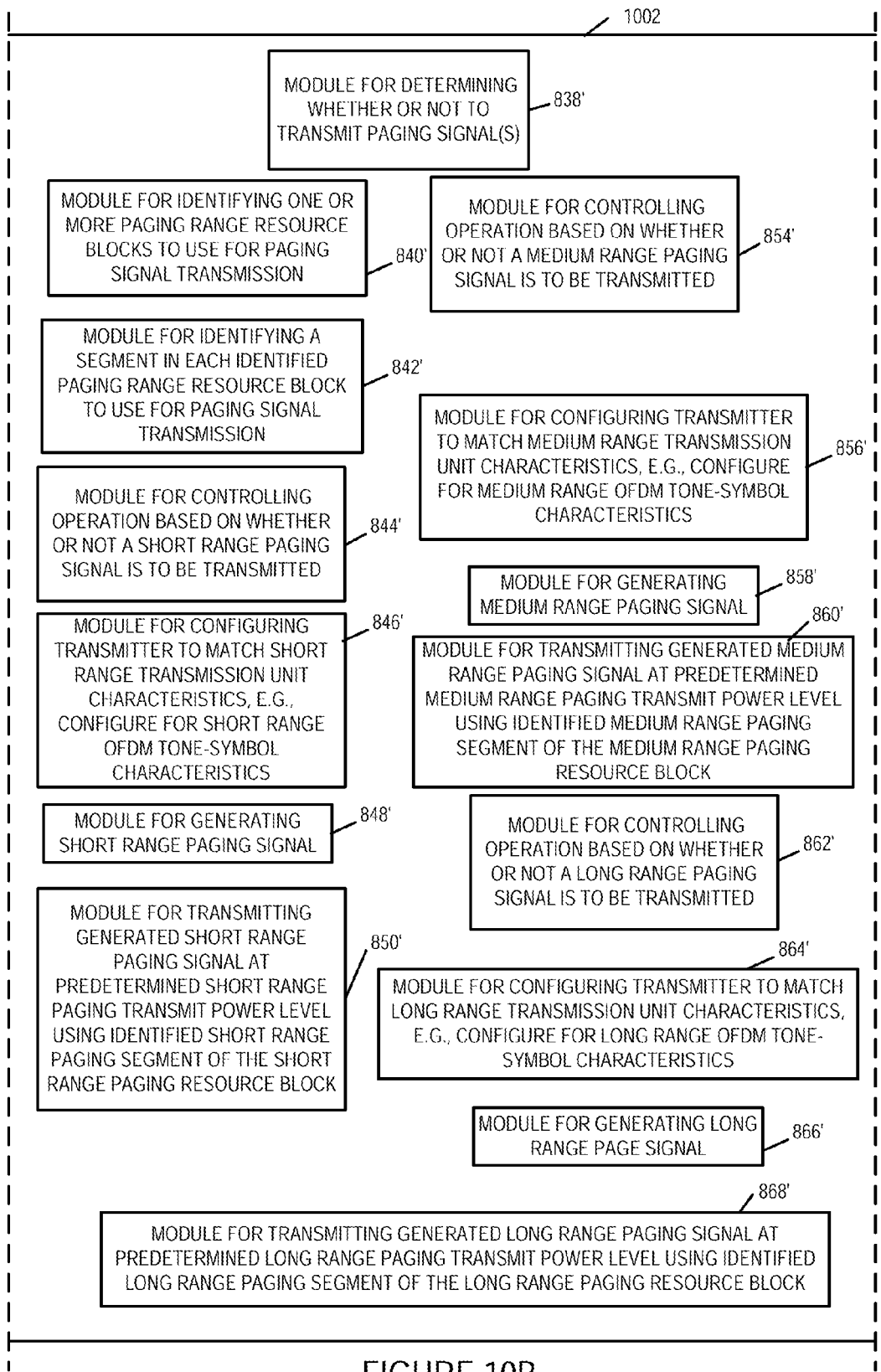
FIG. 10B is a second portion of an assembly of modules which can, and in some embodiments is, used in the communications device illustrated in FIG. 9.
Figure 10C:
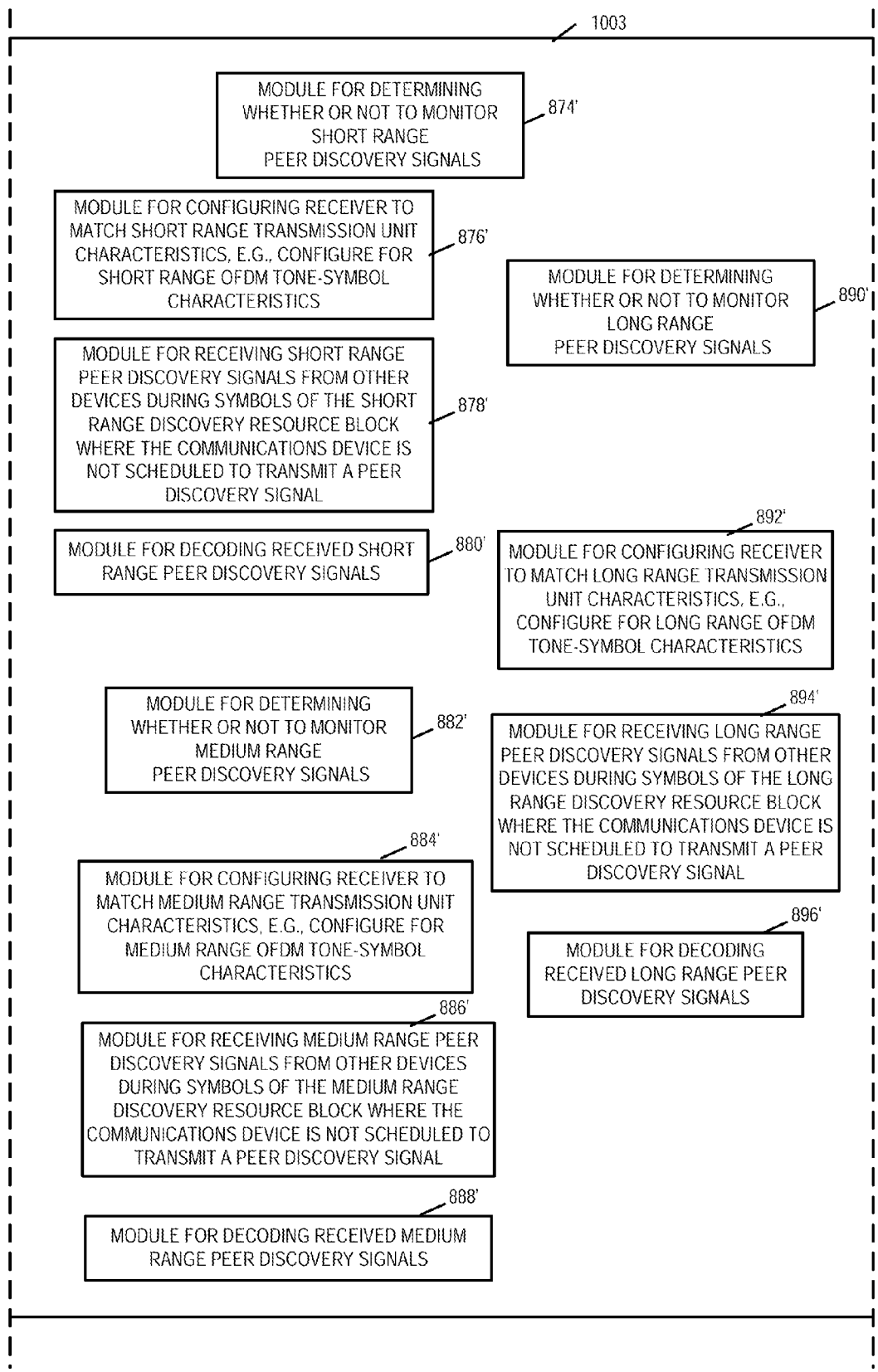
FIG. 10C is a third portion of an assembly of modules which can, and in some embodiments is, used in the communications device illustrated in FIG. 9.
Figures 10, 10D:
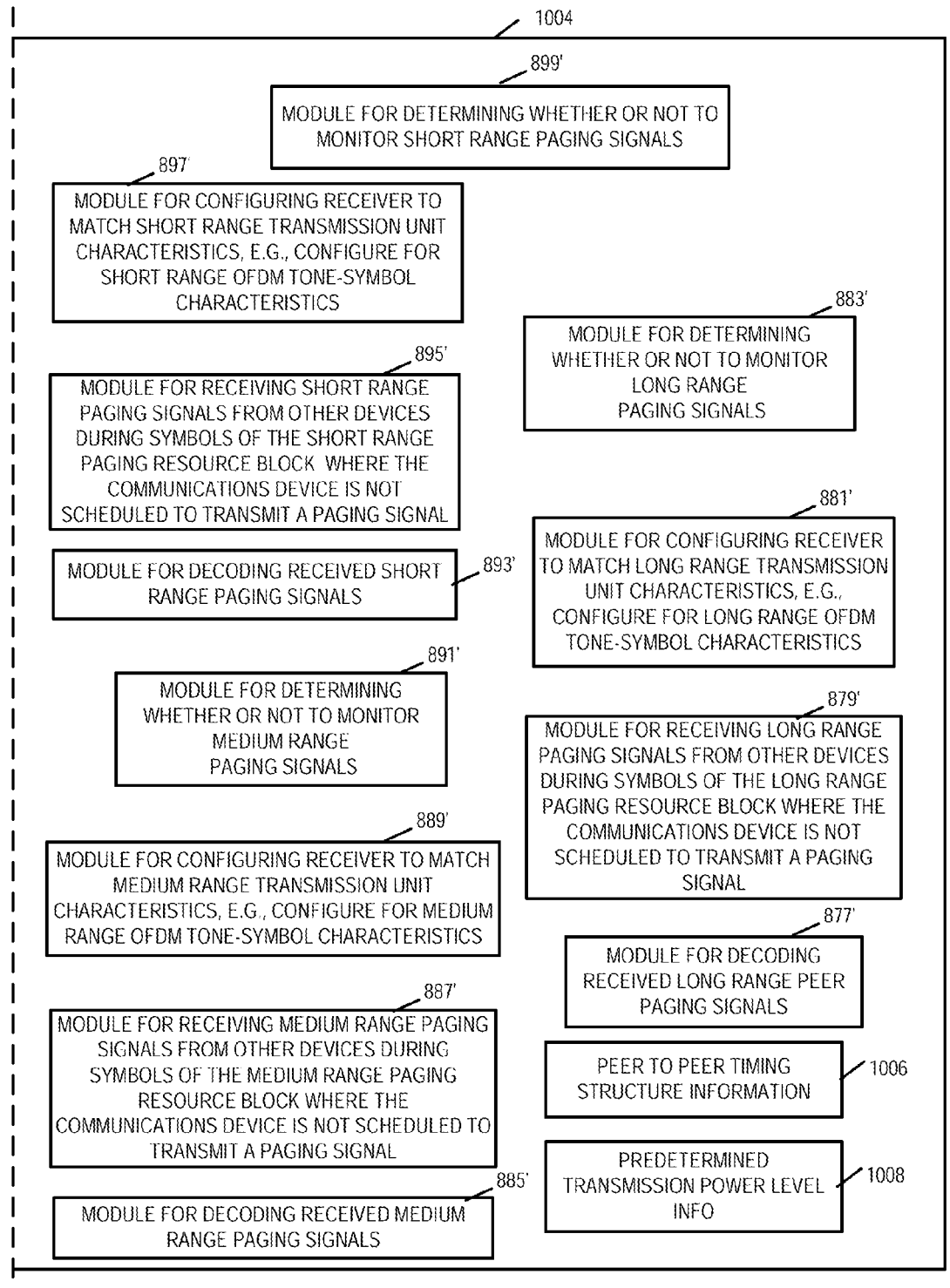
FIG. 10D is a fourth portion of an assembly of modules which can, and in some embodiments is, used in the communications device illustrated in FIG. 9.

FIG. 10, comprising the combination of first portion 1001 of FIG. 10A, second portion 1002 of FIG. 10B, third portion 1003 FIG. 10C and fourth portion 1004 FIG. 10D, is an assembly of modules 1000 which can, and in some embodiments is, used in the communications device 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the communications device 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In some embodiments, processor 902 is configured to implement each of the modules of the assembly of modules 1000. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the communications device 900 or elements therein such as the processor 902, to perform the functions of the corresponding steps illustrated in the method flowchart 800 of FIG. 8.

In the assembly of modules 1000 of FIG. 10 a module with a number followed by corresponds to the same or similar function as a corresponding step in flowchart 800 of FIG. 8. In assembly of modules 1000 of FIG. 10 modules (804', 806', 808', 810', 812', 814', 816', 820', 822', 826', 828', 830', 832', 834', 838', 840', 844', 846', 848', 850', 854', 856', 858', 860', 862', 864', 866', 868', 874', 876', 878', 880', 882', 884', 886', 888', 890', 892', 894', 896', 899', 897', 895', 893', 891', 889', 887', 885', 883', 881', 879', 877') correspond to steps (804, 806, 808, 810, 812, 814, 816, 820, 822, 826, 828, 830, 832, 834, 838, 840, 844, 846, 848, 850, 854, 856, 858, 860, 862, 864, 866, 868, 874, 876, 878, 880, 882, 884, 886, 888, 890, 892, 894, 896, 899, 897, 895, 893, 891, 889, 887, 885, 883, 881, 879, 877), respectively, of flowchart 800 of FIG. 8. For example, module 806' of assembly of modules 1000 of FIG. 10 corresponds to and performs the function of step 806 of flowchart 800 of FIG. 8. Module 806' is a module for identifying one or more peer discovery range resource blocks to use for discovery signal transmission; in step 806 the communications device identifies one or more peer discovery range resource blocks to use for peer discovery signal transmission.

Assembly of modules 1000 also includes peer to peer timing structure information 1006 and predetermined transmission power level information 1008. The peer to peer timing structure information includes, e.g., information corresponding to a short range peer discovery resource block, a medium range peer discovery resource block, a long range peer discovery resource block, a short range paging resource block, a medium range paging resource block, and a long range paging resource block. Peer to peer timing structure information 1006 further includes information corresponding to segments in each of the different types of blocks and information corresponding to basic transmission units, e.g., OFDM tone-symbols, for each of the different type of blocks. In some embodiments, basic transmission units, e.g., OFDM tone-symbols, of the short range blocks have wider tones but shorter symbol transmission times in comparison to those of medium range blocks. In some embodiments, basic transmission units, e.g., OFDM tone-symbols, of the medium range blocks have wider tones but shorter symbol transmission times in comparison to those of long range blocks. The predetermined transmission power level information 1008 includes information identifying, defining, and/or used to determine the transmission power level for a short range peer discovery signal, a medium range peer discovery signal, a long range peer discovery signal, a short range paging signal, a medium range paging signal, and a long range paging signal.

FIGS. 8-10 have been described for an embodiment including different range based resource blocks for peer discovery and paging signals. Some embodiments use different range based resource blocks for one of peer discovery and paging. In some embodiments, another type of signal used in the peer to peer network, e.g., another type of signal transmitted without closed loop power control, is allocated multiple non-overlapping resource blocks in a similar manner to that described with respect to peer discovery and methods and apparatus supporting its implementation are included. Various aspects of the present invention relate to how to perform communication over different physical ranges in a peer-to-peer wireless network.

Various aspects, features, and/or advantages of some embodiments will be described. In some wireless networks, different peers may wish to communicate over different distances. For instance, voice calls may occur over a longer distance than data transfers from a laptop to a printer inside of an office. Consider that the communications are to occur over a peer to peer network. In some peer to peer networks, to be discovered and to initiate communications, the peers send and receive peer discovery and paging signals, prior to communicating peer to peer traffic signals. If both the long-range and short-range communications were to take place over the same time frame and the geographic deployment of users is dense, there are two effects limiting the number of users in the system that can perform mutual discovery and paging:

1) The front-end receivers of peers wishing to receive short-range communications can be, and sometimes are, de-sensed or saturated by the long-range transmissions, and
2) The short-range links will contend with long-range links for transmission resource units since a peer will transmit, in some embodiments, only if it can identify a resource unit on which it detects a low enough interference power.

In some embodiments, the peer discovery and paging signals of the long-range and short-range peers are jointly optimized to support communication over the desired range.

In one embodiment, the peer discovery and paging resources are segmented into two time-frames. The following description focuses on the discovery resources with the understanding that a similar method can be, and sometimes is, applied to paging or any other communication resource. The first and second time-frame may each include a plurality of resource units, each resource unit comprising at least one tone (subcarrier) and at least one time-symbol. Each peer discovery signal will then occupy at least one resource unit.

Continuing with the example, the peers wishing to be discovered over a long range, say 1200 m, transmit their peer discovery signals in the first time-frame and the peers wishing to be discovered over a short range, say 100 m, transmit their peer discovery signals in the second time-frame, where the two time-frames do not overlap in time. In this way, the long-range transmissions will not de-sense receiver front-ends of peers wishing to discover peers in their vicinity, and the short-range transmissions will not contend with long-range transmissions for peer discovery resource units.

In one embodiment, the duration of the time-symbols in the first segment may be longer than in the second segment. For instance, the symbols in the first segment can be generated using a 64-point FFT and the symbols in the second segment can be generated using 32-point FFT, with both types of symbols using 24-chip cyclic prefix. In this way, the peer discovery signals of both the short-range peers will be transmitted at the same transmission power but with less transmitted energy (due to shorter transmission time), thus saving battery life. A typical number of tones available in the first and second frames might be 56 and 28, respectively, and a typical number of time slots might be 64, for a total of 3584 resource units for long-range and 896 resource units for short-range peer discovery, assuming that each resource unit covers one tone and one time slot. As a result of using fewer tones in the second time-frame, the probability of de-sense is lowered among short-range peers themselves. In some embodiments, the cyclic prefix for the short-range symbols is shorter than the cyclic prefix for the long-range symbols.

In another embodiment, the actual transmission power of the short-range signals is less than the transmission power of long-range signals, thus saving power and increasing the spatial reuse of the peer discovery resources. This saving of spatial resources can allow for a shorter duration of the time-frame and fewer resource units for short range users since fewer users will be interfering with each other at any given range.

In another embodiment, the overall peer discovery resource can be divided into three time-frames: one for long-range (WAN range of ~1200 m), one for medium-range (LAN range of ~100 m) and one for short-range users (PAN range of ~10 m). The three time-frames do not overlap in time. The symbol duration of the medium-range users can be larger than that of short-range users but less than that of long-range users. In some embodiments, the cyclic prefix for the short-range symbols is shorter than the cyclic prefix for the medium range symbols, and the cyclic prefix for the medium range symbols is shorter than the cyclic prefix for the long-range symbols.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, using a first communications resource in a first time interval dedicated to short range communications; and using a second communication resource in a second time interval dedicated to long range communications, the first and second time intervals being non-overlapping time intervals.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A communication method, comprising:
   operating a wireless terminal to perform the steps of:
   using a first communications resource in a first time interval dedicated to short range communications, said first communications resource being a first tone-symbol; and
   using a second communication resource in a second time interval dedicated to long range communications, said second communications resource being a second tone-symbol, said first and second tone-symbols differing in at least one of: time duration or width in frequency, the first and second time intervals being non-overlapping time intervals, the first tone-symbol being shorter in time than said second tone-symbol when said first and second tone-symbols differ in time, the first tone-symbol being wider in frequency than said second tone-symbol when said first and second tone-symbols differ in width.

2. The communications method of claim 1, wherein the first and second tone-symbols differ in time duration.

3. The communications method of claim 1, wherein the first and second tone-symbols differ in width in frequency.

4. The method of claim 1, wherein using a first communication resource includes at least one of transmitting or receiving a signal on the first communications resource; and
   wherein using a second communication resource includes at least one of transmitting or receiving a signal on the second communications resource.

5. The method of claim 1,
   wherein said wireless terminal is a mobile peer to peer communications device; and
   wherein said first and second time intervals are peer discovery time intervals.

6. A communication device, comprising:
   means for using a first communications resource in a first time interval dedicated to short range communications, said first communications resource being a first tone-symbol; and
   means for using a second communication resource in a second time interval dedicated to long range communications, said second communications resource being a second tone-symbol, said first and second tone-symbols differing in at least one of: time duration or width in frequency, the first and second time intervals being non-overlapping time intervals, the first tone-symbol being shorter in time than said second tone-symbol when said first and second tone-symbols differ in time, the first tone-symbol being wider in frequency than said second tone-symbol when said first and second tone-symbols differ in width.

7. The communications device of claim 6, wherein the first and second tone-symbols differ in time duration.

8. The communications device of claim 6,
   wherein the first and second tone-symbols differ in width in frequency.

9. The communications device of claim 6,
   wherein said means for using a first communication resource includes at least one of means for transmitting a signal on the first communications resource or means for receiving a signal on the first communications resource; and
   wherein said means for using a second communication resource includes at least one of means for transmitting a signal on the second communications resource or means for receiving a signal on the second communications resource.

10. The communications device of claim 6,
    wherein said communications device is a mobile peer to peer communications device; and
    wherein said first and second time intervals are peer discovery time intervals.

11. A computer program product for use in a communications device, the computer program product comprising:
    a non-transitory computer readable medium comprising:
    code for causing at least one computer to use a first communications resource in a first time interval dedicated to short range communications, said first communications resource being a first tone-symbol; and
    code for causing said at least one computer to using a second communication resource in a second time interval dedicated to long range communications, said second communications resource being a second tone-symbol, said first and second tone-symbols differing in at least one of: time duration or width in frequency, the first and second time intervals being non-overlapping time intervals, the first tone-symbol being shorter in time than said second tone-symbol when said first and second tone-symbols differ in time, the first tone-symbol being wider in frequency than said second tone-symbol when said first and second tone-symbols differ in width.

12. The computer program product of claim 11,
    wherein said communications device is a mobile peer to peer communications device; and wherein said first and second time intervals are peer discovery time intervals.

13. A communications device comprising:

at least one processor configured to:

use a first communications resource in a first time interval dedicated to short range communications, said first communications resource being a first tone-symbol; and use a second communication resource in a second time interval dedicated to long range communications, said second communications resource being a second tone-symbol, said first and second tone-symbols differing in at least one of: time duration or width in frequency, the first and second time intervals being non-overlapping time intervals, the first tone-symbol being shorter in time than said second tone-symbol when said first and second tone-symbols differ in time, the first tone-symbol being wider in frequency than said second tone-symbol when said first and second tone-symbols differ in width; and memory coupled to said at least one processor.

14. The communications device of claim 13, wherein the first and second tone-symbols differ in time duration.

15. The communications device method of claim 13, wherein the first and second tone-symbols differ in width in frequency.

16. The communications device of claim 13, wherein said communications device is a mobile peer to peer communications device; and wherein said first and second time intervals are peer discovery time intervals.

\* \* \* \* \*